UNITED STATES PATENT OFFICE.

FRANZ FISCHER, OF CHARLOTTENBURG, GERMANY.

PROCESS FOR THE MANUFACTURE OF DUCTILE ELECTROLYTIC IRON.

992,952.   Specification of Letters Patent.   Patented May 23, 1911.

No Drawing.   Application filed August 29, 1910.   Serial No. 579,576.

*To all whom it may concern:*

Be it known that I, FRANZ FISCHER, chemist, a subject of the German Emperor, residing at 1 Clausewitzstrasse, Charlottenburg, near Berlin, Germany, have invented certain new and useful Improvements in Processes for the Manufacture of Ductile Electrolytic Iron; and I do hereby declare the following to be a full, clear, and exact description of the invention, such as will enable others skilled in the art to which it appertains to make and use the same.

This invention relates to improvements in the process for the manufacture of electrolytic iron described in my previous application for Letters Patent Ser. Nr. 524217 filed October 23, 1909. In the further development of the said process I have found that to achieve the result stated, it is not absolutely necessary to produce the electrolytes by adding a hygroscopic salt to the iron salts, or by using from the outset a double salt of iron hygroscopic *per se* but that certain sodium salts, not hygroscopic in themselves, can unite with certain not necessarily hygroscopic iron salts, so as to produce hygroscopic double salts, which fulfil the requirements for the bath according to the above application.

The present invention then consists in an improved process for the manufacture of ductile electrolytic iron as described in the aforesaid application, in which instead of adding hygroscopic salts to the electrolyte, sodium salts not hygroscopic in themselves are added which re-act with a not necessarily hygroscopic iron salt in the electrolyte to form a hygroscopic double salt of iron and sodium suitable for the process.

Sal-ammoniac, potassium chlorid and sodium chlorid, in the pure state are all three considered non-hygroscopic. Further sal-ammoniac and potassium chlorid form, with ferrous chlorid, double salts which are not hygroscopic and therefore crystallize out of the hot impregnated solution. (See *Dammer Text-Book of Inorganic Chemistry*, Volume III.)

There is nothing known in technical literature regarding a double salt of ferrous chlorid with sodium chlorid. I have however discovered that contrary to expectation, the addition of sodium salts, especially of the *per se* non-hygroscopic sodium chlorid, to not necessarily hygroscopic iron salts also gives suitable baths of electrolytes which are highly hygroscopic and produce good iron. The addition of sodium chlorid has also the advantage that the solutions conduct better than those containing calcium chlorid in equal concentration.

By bringing, for example, ferrous-sulfate and sodium chlorid together, ferrous chlorid sodium sulfate and sodium ferrous chlorid are obtained as new salts. The two newly formed chlorids are hygroscopic. Or sodium chlorid and ferrous chlorid solution are brought together and an electrolyte is thus obtained which contains hygroscopic sodium ferrous chlorid, and ferrous chlorid.

What I claim is:—

1. An improved process for the manufacture of ductile electrolytic iron, wherein non-hygroscopic sodium salts are so combined with iron salts in the electrolyte as to form a hygroscopic double salt of iron and sodium, substantially as described.

2. An improved process for the manufacture of ductile electrolytic iron, which comprises the addition to an electrolyte of iron salts of sodium chlorid, in such proportions as to produce a hygroscopic double salt of iron and sodium, substantially as described.

3. An improved process for the manufacture of ductile electrolytic iron, which comprises the combination of ferrous sulfate and sodium chlorid in the electrolyte, to form non-hygroscopic salts, substantially as described.

In testimony whereof I have affixed my signature, in presence of two witnesses.

FRANZ FISCHER.

Witnesses:
HENRY HASPER,
ARTHUR SCHROEDER.